Patented Oct. 14, 1924.

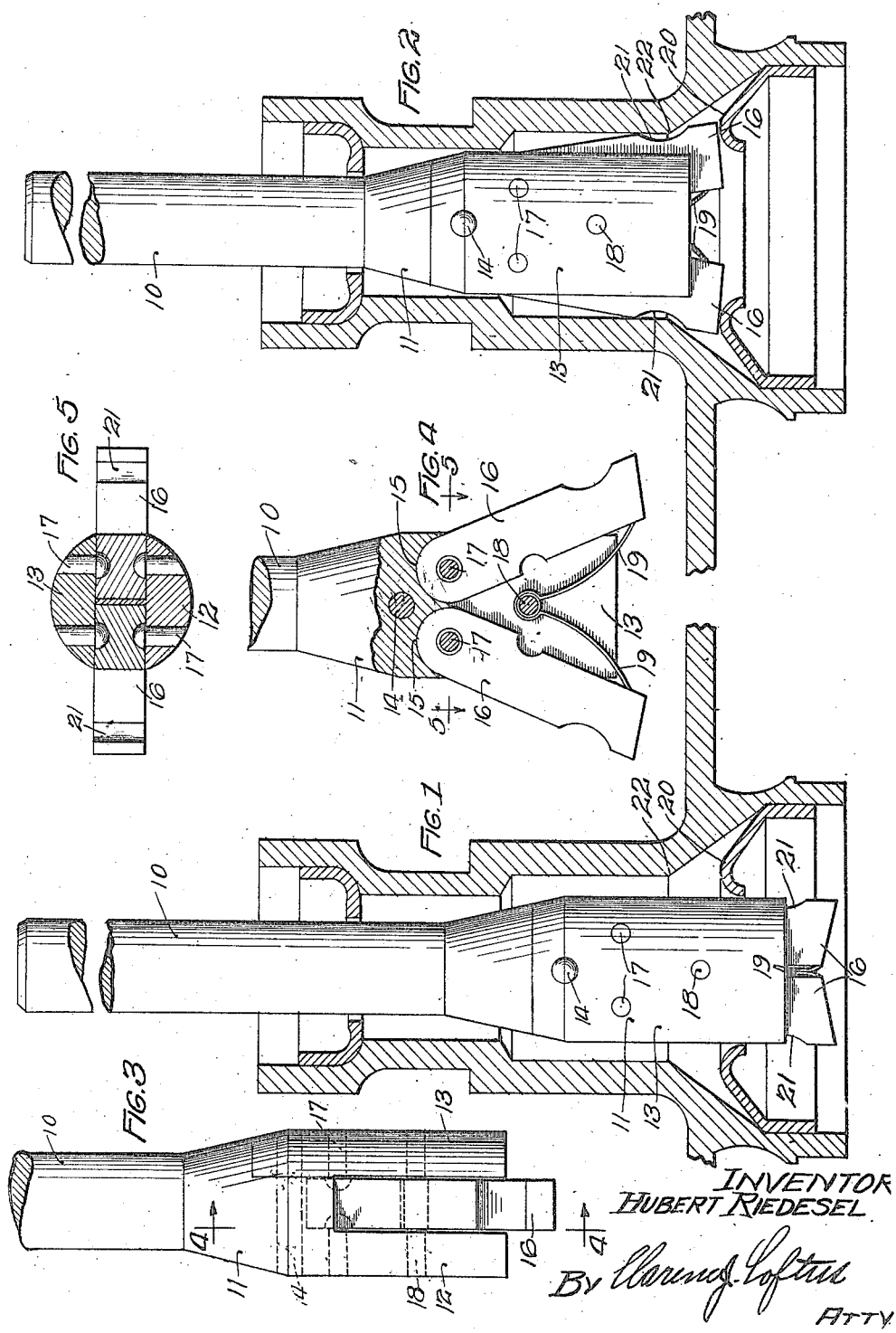

1,511,773

UNITED STATES PATENT OFFICE.

HUBERT RIEDESEL, OF LANESBORO, IOWA.

DEVICE FOR REMOVING CUPS.

Application filed September 14, 1922. Serial No. 588,113.

*To all whom it may concern:*

Be it known that I, HUBERT RIEDESEL, a citizen of the United States, residing at Lanesboro, in the county of Carroll and State of Iowa, have invented a certain new and useful Device for Removing Cups.

This invention pertains to a device for removing cups or races from sockets and particularly inner cups or races from the hub of automobile wheels and the like.

It is an object of my invention to provide a durable, efficient, and inexpensive construction of this character with which such cups and races can be readily removed without causing the cup or race to bind or stick.

The above and other features of novelty, advantages and capabilities, will become apparent from a detailed description of the accompanying drawings, in which I have illustrated one form of my invention, but the construction there shown will be understood as illustrative only and not as defining the limits of my invention.

Fig. 1 is an elevational view of a cup remover embodying one form of my invention, showing the device being inserted in place in the hub of a Ford automobile wheel preparatory to removing the inner cup, the cup and hub being shown in cross section.

Fig. 2 is a similar view showing the device in place the pawls thereof in contact with the inner cup for removing the same by applying pressure to the outer end or handle of the device.

Fig. 3 is an end view of the device, showing a portion of the handle broken away.

Fig. 4 is a side view of the same partially in section taken substantially on the line 4—4 of Fig. 3, and Fig. 5 is a sectional view taken on the line 5—5 of Fig. 4.

Referring to the drawings in detail, the device consists of a cylindrical handle 10, whose diameter is such as to permit it to be passed through the bore in the hub or socket. The handle is provided at its lower end with an enlarged head 11 which head has an off-set integral pawl supporting member 12, and a removable pawl supporting member 13 rigidly fixed to the head 11 by means of the bolt 14. The head 11 is provided with dished bearing sockets 15 to receive the inner rounded end of the opposed pawls 16, thus affording a substantial ball and socket connection between the pawls and head. The pawls are held in such position by means of rivets 17 which rivets pass through openings in the pawl supporting members and enter or register with comparatively shallow aligned sockets on either side of the pawls 16 as best shown in Figs. 3 and 5. Between the head 11 and the lower end of the pawl supporting members 12 and 13 there is positioned a pin 18 extending through from one pawl supporting member to the other. Secured to this pin is a leaf spring 19 whose free ends are in engagement with the inner lower edges of the pawls. This spring has the function of automatically pressing or throwing the pawls outwardly for expanding them. Assuming the device is assembled as shown and it is desired to utilize it, the handle 10 is inserted in the bore of the hub and passed on through as shown in Fig. 1 until the head reaches the position shown in Fig. 2, whereupon the pawls are immediately expanded or thrown outwardly by the spring 19 to the position shown in Fig. 2. All that is then necessary in order to remove the cup 20 is to apply pressure to the outer end of the handle 10 by means of a hammer or the like. In order to afford a substantial and effective contact of the pawls with the inner cup 20, I have provided the pawls on their outer edge near their lower ends with grooves 21 so that the pawls can be thrown in behind the shoulders 22 of the hub. It must be remembered that in a practical and effective device of this type that the proportions and sizes of the parts are necessarily limited, due to the fact that it must be passed through a comparatively small bore in the hub. I have therefore provided an arrangement whereby the maximum strength is obtained for the parts subjected to the greatest strains as I have afforded a substantial and strong bearing contact between the head and pawls and have provided means for retaining the pawls in place without forming holes therethrough.

From the foregoing it will readily be seen that I have provided a very strong, effective and durable construction of this character.

Having thus described my invention, I claim:

1. A tool for removing cups or races from automobile wheel hubs and the like, comprising in combination a head provided with opposed disk bearing sockets, opposed pawls having circular bearings adapted to bear against said sockets and swing therein, means for retaining said pawls in said head and means for automatically expanding said pawls.

2. A tool for removing cups or races from automobile wheel hubs and the like, comprising in combination, a head provided with opposed bearing sockets, opposed pawls having bearings adapted to bear against said sockets and swing therein, means for holding said pawls in said head, said means comprising opposed sockets on each side of said pawls and opposed ball-like bearings in said head, adapted to co-operate with said sockets.

3. A tool for removing cups or races from automobile wheel hubs and the like, comprising in combination a head provided with an offset pawl retaining member, a removable pawl retaining member, a pair of opposed pawls provided on the surface near their inner ends, with opposed sockets and bearings carried by said retaining members and adapted to co-operate with said sockets for holding said pawls in place.

4. A tool for removing cups or races from automobile wheel hubs and the like, comprising in combination a head provided with opposed sockets, pawls pivotally connected to said head and provided with bearings adapted to bear against and co-operate with said sockets in a manner to relieve the pivotal connection from carrying the strain imposed on the tool.

In witness whereof, I have hereunto subscribed my name to this specification in the presence of two witnesses.

HUBERT RIEDESEL.

Witnesses:
 HENRY MILLER,
 LAURENCE SHEFFIELD.